Nov. 13, 1951  W. A. SHIRE  2,575,193
FRACTIONATING APPARATUS
Filed Oct. 30, 1947

Inventor:
William A. Shire
By Vanderveer Voorhees
Attorney

Patented Nov. 13, 1951

2,575,193

UNITED STATES PATENT OFFICE 2,575,193

FRACTIONATING APPARATUS

William A. Shire, Whiting, Ind., assignor to Standard Oil Company, Chicago, Ill., a corporation of Indiana Application October 30, 1947, Serial No. 783,025

4 Claims. (Cl. 261—113)

This invention relates to an apparatus for fractionating liquids and particularly for the fractionation of liquids on the laboratory scale where control of the operation is normally difficult because of the small amounts of liquid involved and low rates of flow. One object of the invention is to provide for use on the laboratory scale a bubble plate having the desirable characteristics of bubble plates used in commercial fractionation operations. Another object of the invention is to provide a bubble plate fractionating tower construction which is resistant to corrosion by liquids of all sorts encountered in the laboratory. Still another object of the invention is to provide a convenient and simple bubble plate element which can be made cheaply in quantity and assembled easily in fractionating columns of varying heights and efficiencies.

It has long been recognized that the bubble plate fractionating tower possesses certain inherent advantages difficult to achieve in packed fractionating towers, the principal advantage being flexibility in operation and reliability in performance. A well-designed bubble plate tower with a reasonable reflux ratio can produce a degree of fractionation which approaches the theoretical for the number of plates employed. It is substantially impossible, however, to construct for use on the laboratory scale small bubble plate columns which meet the requirements of the laboratory with respect to simplicity of design, transparency for ease of operation control and resistance to corrosive vapors and liquids. According to my invention, a bubble plate design is provided by which the plate can be made entirely of glass with a simple unit construction which substantially solves the problems heretofore encountered.

The invention is described by a drawing which shows in Figure 1 a preferred bubble plate unit;

Figure 1:
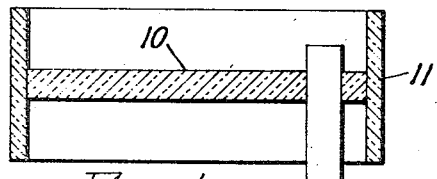

Referring to Figure 1, the horizontal plate 10 is formed of a porous or foraminous material which will permit the passage of vapors upwardly thru it while maintaining a slight back pressure or resistance to vapor flow. For my purpose, it is generally desirable to have a plate resistance or inverse porosity ranging from about 0.5 to 10 where the resistance is expressed in millimeters of mercury pressure required to force a gas at normal conditions of temperature and pressure thru the plate at a rate of one linear foot per second. This unit varies slightly with different gases, and for convenience air is used as the standard gas for determining porosity. The degree of porosity required varies with different liquids depending on their density and viscosity, and also varies with the depth of liquid on the plates and vapor velocity required in the column for most efficient operation. The range of porosity can be calculated from the following formula:

$$DL<13.5R<DH$$

in which D and L are the density and depth, respectively, of the liquid on the plate, R is the resistance as defined hereinabove, and H is the height of the downcomer or overflow between plates.

I have found that open screens, perforated plates, etc., are generally inoperative because of too high porosity, resulting in channeling of reflux liquid downwardly thru the plate while the column is in operation. I prefer to use in the construction of my plates a material of substantial thickness and heterogeneous porosity such as fritted glass. I may also use porous earthenware or porous forms of metals which are not subject to corrosion with the liquids employed. A layer or mat of glass wool held between perforated plates or screens of corrosion-resistant metal may also be used. Multiple layers of screens may likewise be used. An important advantage of the fritted glass construction lies in the convenience of cleaning with concentrated acids when the porosity has undergone a reduction in use owing to deposits within the interstices of the plate, thus restoring the plates to their original condition of porosity. Plates of higher or lower porosity can be employed depending on the rate of vapor flow for which the column is designed. When using the bonded grain plate of which fritted glass is typical, I have found that a plate ⅛ inch thick resists the flow of air at one foot per second, as shown in the table:

| Mean pore size in microns | 25 | 50 | 65 |
|---|---|---|---|
| Resistance—mm. mercury | 23.6 | 3.42 | 0.75 |

The void space in suitable porous plates ranges from about 25 to 60 per cent of the plate volume.

A significant feature of my invention is the use of porous plates of substantial thickness in which the resistance to vapor flow thru the plates results from the distortion of the vapor passages which have a labyrinthine form rather than from the use of constricted passages in a single membrane as in the case of a perforated metal sheet where the resistance to vapor flow is due to a multiple orifice effect. Where the orifice effect is depended upon to maintain the necessary pressure differential across the plate, I have found that the action is critical on account of the movement and fluctuation in depth of liquid on the plate resulting in by-passing and short-circuiting. By the use of plates of substantial thickness, e. g. about one-eighth to one-half inch, with labyrinthine passages, a uniform distribution of vapors across the plate can be obtained without short-circuiting of reflux liquid downward thru the plate because of the pressure gradient thru the plate itself. I have found that it is desirable to employ opaque plates, i. e. porous plates thru which there is sufficient distortion of the passages to prevent observance of an image thru the pores.

Referring again to Figure 1, plate 10 is joined to ring or annulus 11 by any suitable means, for example by cementing. In the case where the porous plate 10 is constructed of ceramic or fritted glass material, it is preferred to make ring 11 of transparent glass, e. g. sectional glass tubing, and join the plate to the ring by fusion. The use of transparent glass for ring 11 is particularly advantageous in providing for visual control in the operation of laboratory fractionating apparatus.

There is also provided in plate 10 overflow tube 12 for conducting liquid from above the plate to the plate below or to the boiler, and for maintaining the desired level of liquid on the plate suitably about one-fourth to three-fourths inch. When employing a fritted glass plate, the overflow tube can conveniently be a glass tube fused into the plate. However, if the overflow tube is sealed to the plate it should be of sufficient cross-sectional area to provide for adequate flow of reflux liquid downwardly thru the tower. More than one overflow tube can be used if desired, and these may be spaced at convenient points in the plates, for example at opposite sides. When assembling the plates, the overflow tubes can be staggered as shown in Figure 4, and if two overflow tubes are on each plate, alternate plates can be rotated ninety degrees to provide for cross flow of reflux liquid on the plates.

Figure 4:
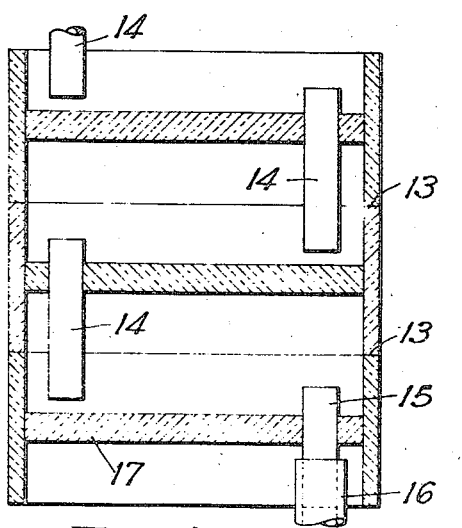
Figure 4 illustrates the manner of assembling the units in a fractionating column.

As shown in Figure 4, the plates are assembled in staggered arrangement and it is preferred to have the contacting surfaces 13 between adjacent sections ground planar to provide substantially liquid-tight, vapor-tight seals between the sections. Otherwise, it may be desirable to assemble the sections with a suitable gasket material therebetween. In the arrangement shown, the overflow tubes 14 are sufficiently long to reach to a point near the surface of the plate below. However, for convenience in manufacture, the overflows may be made to extend not beyond the rim of the plate as illustrated at 15. In assembling plates with short overflows, an extension sleeve 16 is fitted closely to the overflow and adjusted to reach the surface of the plate below, thereby forming a vapor seal and forcing the vapors to pass upwardly thru the porous plate 17. The sleeve 16 can be cut at an angle on the lower end or serrated to allow free escape of reflux liquid onto the lower plate. In the form of construction shown in Figure 2, the overflow 18 passes thru porous plate 19 about the same distance on both sides of the plate providing for reversibility.

Figure 2:
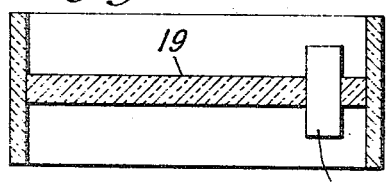
Figures 2 and 3 illustrate alternative forms of the bubble plate unit.
Figure 3:
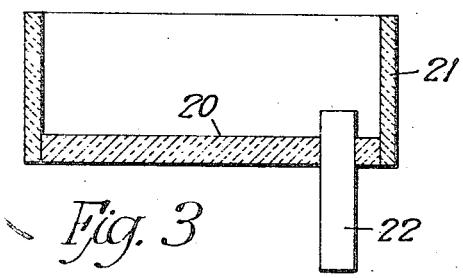

In accordance with my invention, it is not necessary that the porous plate be symmetrically located within the rim as shown in Figures 1 and 2. Figure 3 shows a construction in which the porous plate 20 is located at the bottom of rim 21. In accordance with this construction it is necessary that the overflow 22 extend below the rim in order to provide a seal in the liquid on the plate below when the unit is assembled with other units in a fractionating column.

Figure 5:
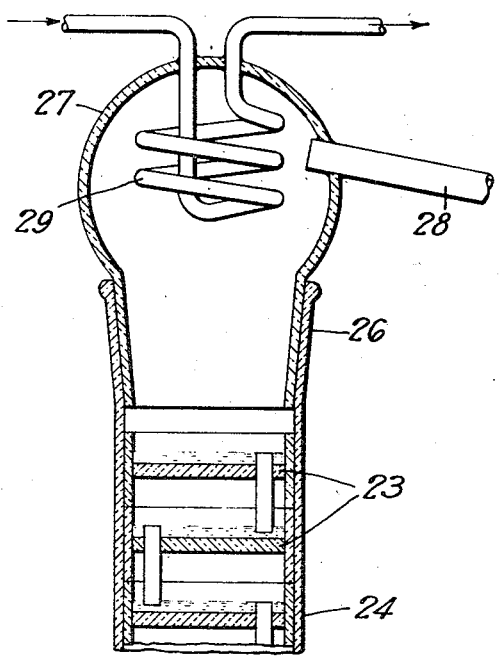
Figure 5 shows a laboratory fractionating column assembly with bubble plates in place.

Because of the difficulty of providing completely vapor-tight seals between the fractionating units or plate elements shown in Figures 1, 2 and 3, I prefer to assemble the plates within an outer tube or casing as shown in Figure 5. Referring to Figure 5, the plate elements 23 are shown partly in cross section within the column or casing 24 adapted to extend from a liquid boiler or vapor supply at the lower end to a distillate head at the top. This casing may suitably be made of glass providing a high resistance to corrosive liquids and vapors and also providing for visual inspection of the operation of the fractionator. In this case the lower end of the casing 25 is conveniently contracted to fit within a distillation flask while the upper end 26 is conveniently flared to receive a stopper or ground fitting attached to the distillate head 27 into which extends vapor side arm 28. Reflux may be provided by a cooling coil 29 or by other suitable means.

The fractionating plates 23 may rest on a flange or other suitable support at the bottom of the tower and it is preferred that the plate elements fit closely within casing 24, thereby avoiding the necessity of packing between the plate elements and the inner wall of the casing. If the clearance between the plate elements and the casing wall is not very great, e. g. not more than about ½ to 2 millimeters, then the condensate forming in the space will be sufficient to effect a satisfactory seal and prevent leakage of vapors around the plates.

Having thus described my invention what I claim is:

1. Fluid contacting apparatus which comprises a cylindrical shell, a lower cylindrical section and a plurality of upper cylindrical sections slidable within said shell with the lower surface of each upper section bearing on the upper surface of the next adjacent lower section to provide a sealed inner cylindrical shell, a porous plate at least about one-eighth inch in thickness extending across each cylindrical section and sealed to the inner surface thereof, a conduit extending through said plate and sealed thereto with its upper end extending above the plate a distance L and the lower end extending downwardly to a level below the upper level of the conduit in the sub-adjacent section, the conduit length providing a distance H between the level of liquids maintained on adjacent plates, the density of said liquids being D, the porosity of said plates being such as to provide a labyrinthine passageway therethrough and such that the pressure required to force air under standard conditions through the plate at a rate of one linear foot per second is a value R in the range of .5 to 10 millimeters of mercury and wherein the product of D times L is less than the product 13.5 times R which in turn is less than the product of D times H.

2. The apparatus of claim 1 wherein both the outer cylindrical shell and inner shell formed by cylindrical sections are transparent.

3. Fluid contacting apparatus which comprises a cylindrical shell, a lower cylindrical section and a plurality of upper cylindrical sections slidable within said shell with the lower surface of each upper section bearing on the upper surface on the next adjacent lower section to provide a sealed inner cylindrical shell, a porous plate of bonded grain structure extending across each cylindrical section and sealed to the inner surface thereof, said porous plate being at least about one-eighth inch in thickness, having an average pore size of approximately 50 microns and a void space of about 25 to 50 per cent of the plate volume whereby a labyrinthine passageway is provided through the plate, a conduit extending through said plate and sealed thereto with its upper end terminating above the upper plate surface and its lower end terminating at a level close to but spaced from the next lower plate surface whereby downflowing liquid is retained on each plate up to the upwardly projecting level of the conduit and liquid flows downwardly through the conduit and is discharged therefrom below the level of the liquid maintained on the next sub-adjacent plate while upwardly flowing fluid passes through the labyrinthine passageways and is uniformly diffused in the body of liquid which is retained on each plate.

4. The apparatus of claim 3 wherein both the outer cylindrical shell and the inner shell formed by cylindrical sections are transparent.

WILLIAM A. SHIRE.

REFERENCES CITED

The following references are of record in the file of this patent:

UNITED STATES PATENTS

| Number | Name | Date |
|---|---|---|
| 1,442,414 | Rose | Jan. 16, 1923 |
| 1,711,656 | Risdon | May 7, 1929 |
| 1,723,657 | Pavitt | Aug. 6, 1929 |
| 1,725,925 | Kent | Aug. 27, 1929 |
| 2,143,015 | Kleinschmidt | Jan. 10, 1939 |
| 2,317,101 | Lecky | Apr. 20, 1943 |
| 2,369,913 | Palkin et al. | Feb. 20, 1945 |

FOREIGN PATENTS

| Number | Country | Date |
|---|---|---|
| 169,605 | Great Britain | Oct. 6, 1921 |
| 152,237 | Switzerland | Apr. 1, 1932 |

OTHER REFERENCES

Scientific American, December 1929, page 530.